United States Patent
Rogall

[15] 3,680,393
[45] Aug. 1, 1972

[54] ACCELEROMETER

[72] Inventor: Herbert Rogall, Maplewood, N.J.

[73] Assignee: The Singer Company, New York, N.Y.

[22] Filed: Oct. 27, 1969

[21] Appl. No.: 869,611

[52] U.S. Cl. .............................................. 73/517 B
[51] Int. Cl. .............................................. G01p 15/08
[58] Field of Search ............... 73/516 R, 517 B, 497

[56] References Cited

UNITED STATES PATENTS 2,985,021  5/1961  Lewis et al. ................ 73/517 B
2,888,256  5/1959  Sedgfield .................... 73/517 B

*Primary Examiner*—James J. Gill
*Attorney*—S. A. Giarratana and S. Michael Bender

[57] ABSTRACT

An accelerometer in which a pendulum is normally aligned in a gap defined by a pair of spaced magnets, and is adapted to move relative to the magnets in response to an acceleration and generate a signal. A magnetic field is created in proportion to the signal which interacts with the magnetic flux from the magnets, causing the pendulum to realign, and the flux level from each magnet can be regulated in order to compensate for non-linearities.

8 Claims, 3 Drawing Figures

PATENTED AUG 1 1972 3,680,393

INVENTOR.
HERBERT ROGALL

BY
S. A. Giovanana
ATTORNEYS

ACCELEROMETER

BACKGROUND OF THE INVENTION

This invention relates to an accelerometer and, more particularly, to a linear single axis accelerometer adapted to provide an electrical output signal proportional to input acceleration.

Accelerometers of the above type have been proposed, and generally include a pendulous mass having a movable portion carrying a displacement transducer and an electromagnetic torquer. The mass moves in response to acceleration between a pair of spaced magnets carrying the fixed elements of the transducer, and generates an output signal which activates the torquer and causes the pendulous mass to return to a null position. This signal passing through the circuit is proportional to acceleration.

However, in these arrangements, the output signal is often not linear due to varying mechanical and magnetic properties of the magnets and their associated pole pieces and coils. Also, there is no means of setting or adjusting the scale factors of the accelerometers, and for compensating for transient changes in scale factors due to changes in environmental conditions.

SUMMARY OF THE INVENTION

It is, therefore, an object of the present invention to provide an accelerometer of the above type which can be adjusted so that the output signal is linearly proportional to input accelerations.

It is a further object of the present invention to provide an accelerometer of the above type in which the scale factor of the accelerometer can be adjusted, and transient changes in the scale factor can be compensated for.

Toward the fulfillment of these objects the accelerometer of the present invention comprises at least one magnet, a pendulum normally aligned in proximity to said magnet and adapted to move relative to said magnet in response to an acceleration, means for generating a signal in response to said movement, means for creating a magnetic flux in response to said signal for interacting with the magnetic flux produced by said magnet in a manner to realign said pendulum, and means to regulate the flux level produced by said magnet.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
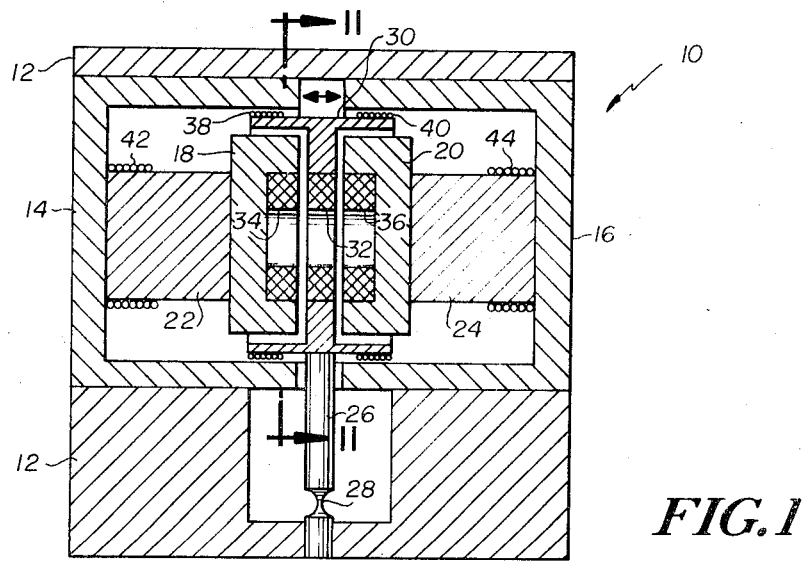
FIG. 1 is a vertical cross-sectional view of the accelerometer of the present invention.
Figure 2:
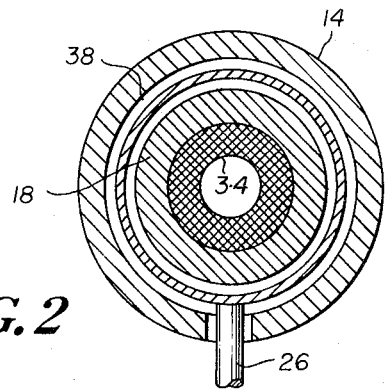
FIG. 2 is a vertical cross-sectional view taken along the line II—II of FIG. 1.

Referring specifically to FIGS. 1 and 2 of the drawings, the accelerometer of the present invention is shown by the reference numeral 10 and comprises a housing 12 in which is disposed a pair of outer pole pieces 14 and 16 and inner pole pieces 18 and 20. These pole pieces are circular and each has a generally U-shaped cross section.

A pair of magnets 22 and 24 are mounted between the pole pieces 14 and 18 and between the pole pieces 16 and 20, respectively, and each is adapted to emit a magnetic flux which travels through its respective outer pole piece, and returns through an air gap between its pole pieces to its respective inner pole piece, in a known manner.

A pendulum 26 has a base portion fixed within the housing 12 and a necked down flexure portion 28 which enables the pendulum to oscillate between the pole pieces 18 and 20 in a direction indicated by the arrows in FIG. 1, in response to acceleration.

A bobbin 30 extends around the pole pieces 18 and 20 and is fixed to the upper end of the pendulum 26 so that the bobbin will oscillate with the pendulum. A secondary, or pick-off coil 32 is mounted within the bobbin and moves with the pendulum relative to a pair of primary, or stationery coils 34 and 36 supported in the pole pieces 18 and 20, respectively. A pair of torquer coils 38 and 40 are wound with a continuous wire around the bobbin 30 for providing a means for restoring the bobbin and therefore the pendulum, to their neutral positions in the following manner.

The primary coils 34 and 36 are supplied with an electrical current from an external source, so that when the movable coil 32 moves between them in response to acceleration, a voltage is induced in the latter coil. The resultant current is supplied to the torquer coils 38 and 40 via a servo loop, shown in detail later, and is proportional to acceleration. The direction and magnitude of the resultant magnetic flux generated by the torquer coils 38 and 40 is such that it interacts with the magnetic flux from the magnets 22 and 24 to restore the pendulum 26 to a neutral position.

According to a main feature of the present embodiment a pair of additional coils 42 and 44 are wrapped around the magnets 22 and 24, respectively, and are connected in series with the torquer coils 38 and 40 in the above servo loop in order to regulate the level of the magnetic flux from the magnets 22 and 24. This regulation of magnetic flux can thus correct for nonlinearities of output signal due to varying mechanical and magnetic properties of the magnets, pole pieces, and coils which causes the flux produced by one magnet to be different from the flux produced by the other.

Figure 3:
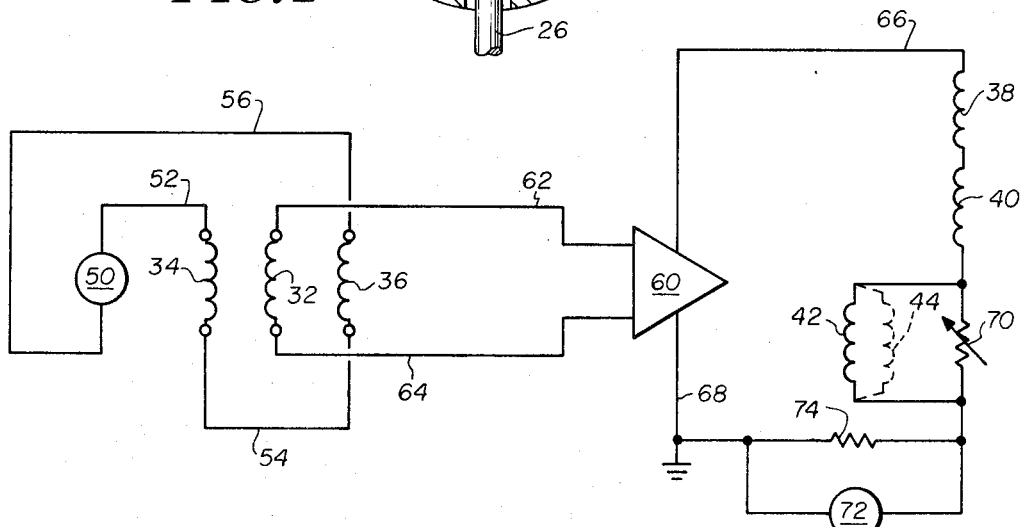
FIG. 3 is a circuit diagram of the circuit utilized in the accelerometer of the present invention.

The circuit associated with the accelerometer of the present invention is shown in FIG. 3, and includes an alternating current source 50 which connects the primary coils 34 and 36 in series by line conductors 52, 54 and 56. An amplifier 60 connects the secondary coil 32 to the torquer coils 38 and 40 via the line conductors 62, 64, 66, and 68.

The compensation coil 42 is connected in series with the torquer coils 38 and 40, and the amount of current to the coil 42 is regulated by means of a shunt resistor 70 connected in parallel with the coil. A meter 72 is interposed between the amplifier 60 and the compensation network, and across a resistance 74 to provide an indication of the current through the system, which current is proportional to acceleration.

It is therefore seen that, by a simple adjustment of the shunt resistor 70, the amount of current to the coil 42 can be regulated which, in turn, regulates the amount of magnetic flux in the air gap between the pole pieces 14 and 18 to correct for non-linearities of output signal caused by variations in the magnetic properties of the magnet 22, the pole pieces 14 and 18 and the coil 34.

Of course, the coil 44 may be connected in the same circuit in place of the coil 42, as shown by the dotted lines in FIG. 3, in the event it is desired to regulate the magnetic flux in the air gap between the pole pieces 16 and 20, in the same manner as discussed above.

The compensation coils 42 and 44 can also be used to set and adjust the operating points of their respective magnets 22 and 24 by passing a large direct current from an external source through either coil. Thus, the flux level in the air gaps can be increased to higher levels up to saturation without the use of any other charging devices. It is noted that since the magnitude of the current required to set and adjust the flux level via the compensation coils 42 or 44 is four to five magnitudes higher than that required to compensate for linearity errors, the above described linearity compensation will not permanently change the flux level in the air gap.

Since the electrical currents can be regulated to very precise values and since the close proximity of the compensation coils provides a highly sensitive effect on the flux level, a precise means of both setting and adjusting the flux level in the air gap can be achieved. Therefore, the scale factor of the accelerometer, which is directly proportioned to this flux level, can be adjusted within a very accurate range.

It is also noted that changing environmental conditions such as rapidly changing temperatures will cause the flux level and the air gap to be changed in a different manner when the changes in the environmental conditions are relatively slow, due to time delays that are inherent in physical devices. These time delays can be simulated electrically by networks consisting of electrical components such as resistors and capacitors and compensated for in a similar manner as described above.

Of course, other variations of the specific construction and arrangement of the accelerometer disclosed above can be made by those skilled in the art without departing from the invention as defined in the appended claims.

I claim:

1. An accelerometer comprising at least one magnet, a movable member normally aligned in proximity to said magnet and adapted to move relative to said magnet in response to an acceleration, means for generating a signal in response to said movement, means for creating a magnetic flux in response to said signal for interaction with the magnetic flux produced by said magnet in a manner to realign said movable member, and means to regulate the flux level produced by said magnet, wherein said means for generating a signal in response to said movement is in the form of a first coiled conductor fixed with respect to said movable member and a second coiled conductor fixed with respect to said magnet and conducting an electrical current, whereby said movement of said first conductor induces a voltage therein, and wherein said means for creating a magnetic flux comprises a third coiled conductor carried by said movable member and connected in circuit with said first coiled conductor, and whereby said means to regulate said flux level comprises a fourth electrical conductor coiled around said magnet and connected in circuit with said first and third conductors.

2. The accelerometer of claim 1 wherein there are two magnets spaced apart to form a gap and wherein said movable member is normally aligned in said gap.

3. The accelerometer of claim 1 further comprising a variable resistance connected in parallel with said fourth conductor and adapted to regulate the current thereto.

4. The accelerometer of claim 1 wherein said fourth electrical conductor has terminals arranged so as to be connected to an external source of electrical current to adjust the operating point of said magnet and therefore the scale factor of said accelerometer.

5. An accelerometer comprising at least one magnet, a movable member normally aligned in proximity to said magnet and adapted to move relative to said magnet in response to an acceleration, means for generating a signal in response to said movement, means for creating a magnetic flux in response to said signal for interaction with the magnetic flux produced by said magnet in a manner to realign said movable member, and means to regulate the flux level produced by said magnet, wherein said means for generating a signal in response to said movement comprises transducer means fixed with respect to said movable member and with respect to said magnet, and wherein said means to regulate said flux level comprises a coiled electrical current carrying conductor connected in circuit with said transducer means and disposed in proximity to said magnet and adapted to conduct a current in proportion to said signal.

6. The accelerometer of claim 5 further comprising a variable resistance connected in parallel with said conductor and adapted to regulate the current thereto.

7. The accelerometer of claim 5 wherein said conductor has terminals arranged so as to be connected to an external source of electrical current to adjust the operation point of said magnet and therefore the scale factor of said accelerometer.

8. The accelerometer of claim 5 wherein said movable member is in the form of a pendulous mass adapted to oscillate relative to said magnet.

* * * * *